United States Patent
Maitrejean et al.

(10) Patent No.: US 12,493,127 B2
(45) Date of Patent: Dec. 9, 2025

(54) MATRIX OF DETECTORS WITH STAGGERED COLUMNS

(71) Applicant: SMITHS DETECTION FRANCE S.A.S., Vitry-sur-Seine (FR)

(72) Inventors: Serge Maitrejean, Vitry-sur-Seine (FR); Jean-Michel Faugier, Vitry-sur-Seine (FR); Thibaut Berthelier, Vitry-sur-Seine (FR); Estelle Gasser, Vitry-sur-Seine (FR)

(73) Assignee: SMITHS DETECTION FRANCE S.A.S., Vitry-sur-Seine (FR)

( * ) Notice: Subject to any disclaimer, the term of this patent is extended or adjusted under 35 U.S.C. 154(b) by 356 days.

(21) Appl. No.: 17/998,989

(22) PCT Filed: May 17, 2021

(86) PCT No.: PCT/GB2021/051179
§ 371 (c)(1),
(2) Date: Nov. 16, 2022

(87) PCT Pub. No.: WO2021/234354
PCT Pub. Date: Nov. 25, 2021

(65) Prior Publication Data
US 2023/0213667 A1    Jul. 6, 2023

(30) Foreign Application Priority Data
May 18, 2020   (GB) ...................... 2007299

(51) Int. Cl.
*G01T 1/20*    (2006.01)
*G01T 1/164*   (2006.01)
(Continued)

(52) U.S. Cl.
CPC ........ *G01T 1/20181* (2020.05); *G01T 1/1644* (2013.01); *G01T 1/20* (2013.01);
(Continued)

(58) Field of Classification Search
CPC ..... G01T 1/1644; G01T 1/20; G01T 1/20181; G01T 1/243
See application file for complete search history.

(56) References Cited

U.S. PATENT DOCUMENTS 9,864,074 B1    1/2018   Newman
10,191,160 B1   1/2019   Newman
(Continued)

FOREIGN PATENT DOCUMENTS

| GB | 2533861 A | 7/2016 |
| GB | 2552538 A | 1/2018 |
| WO | 9807369 A1 | 2/1998 |

OTHER PUBLICATIONS

PCT International Search Report and Written Opinion, Application No. PCT/GB2021/051179, dated Aug. 31, 2021, 10 pages.
(Continued)

*Primary Examiner* — Mark R Gaworecki
(74) *Attorney, Agent, or Firm* — Armstrong Teasdale LLP

(57) ABSTRACT

In one example, there is provided a matrix of detectors configured to be used in a system for inspecting cargo using inspection radiation. The matrix includes a plurality of columns of detector modules, the detector modules of each column extending along a substantially longitudinal direction, each detector module including a surface configured to receive the inspection radiation, and the plurality of columns of detector modules being adjacent to each other in a lateral direction substantially perpendicular to the longitudinal direction and substantially parallel to the surfaces of the detector modules, wherein the plurality of columns of detector modules includes at least two columns of detector modules being offset with respect to each other in an in-depth direction substantially perpendicular to both the lateral direction and the longitudinal direction.

13 Claims, 5 Drawing Sheets

(51) Int. Cl.
*G01T 1/24* (2006.01)
*G01V 5/20* (2024.01)
*G01V 5/22* (2024.01)
*G01V 5/26* (2024.01)

(52) U.S. Cl.
CPC ............... *G01T 1/243* (2013.01); *G01V 5/20* (2024.01); *G01V 5/22* (2024.01); *G01V 5/26* (2024.01)

(56) References Cited

U.S. PATENT DOCUMENTS

| | | | |
|---|---|---|---|
| 10,261,200 B1 | 4/2019 | Newman | |
| 10,416,318 B1* | 9/2019 | Newman | G01T 1/204 |
| 2008/0298545 A1* | 12/2008 | Bueno | G01V 5/224 |
| | | | 378/57 |
| 2011/0116600 A1* | 5/2011 | Morton | G01V 5/224 |
| | | | 378/86 |
| 2015/0325401 A1 | 11/2015 | Langeveld et al. | |
| 2019/0239833 A1 | 8/2019 | Ikhlef | |
| 2020/0400857 A1* | 12/2020 | Newman | G01T 1/29 |

OTHER PUBLICATIONS

UK Search Report, Application No. GB2007299.7, dated Nov. 19, 2020, 3 pps.

\* cited by examiner

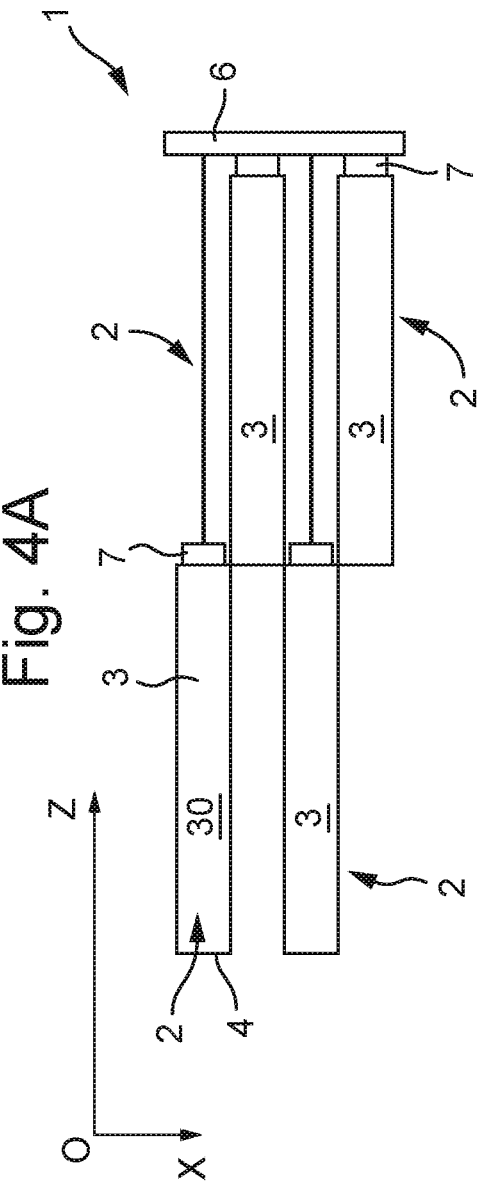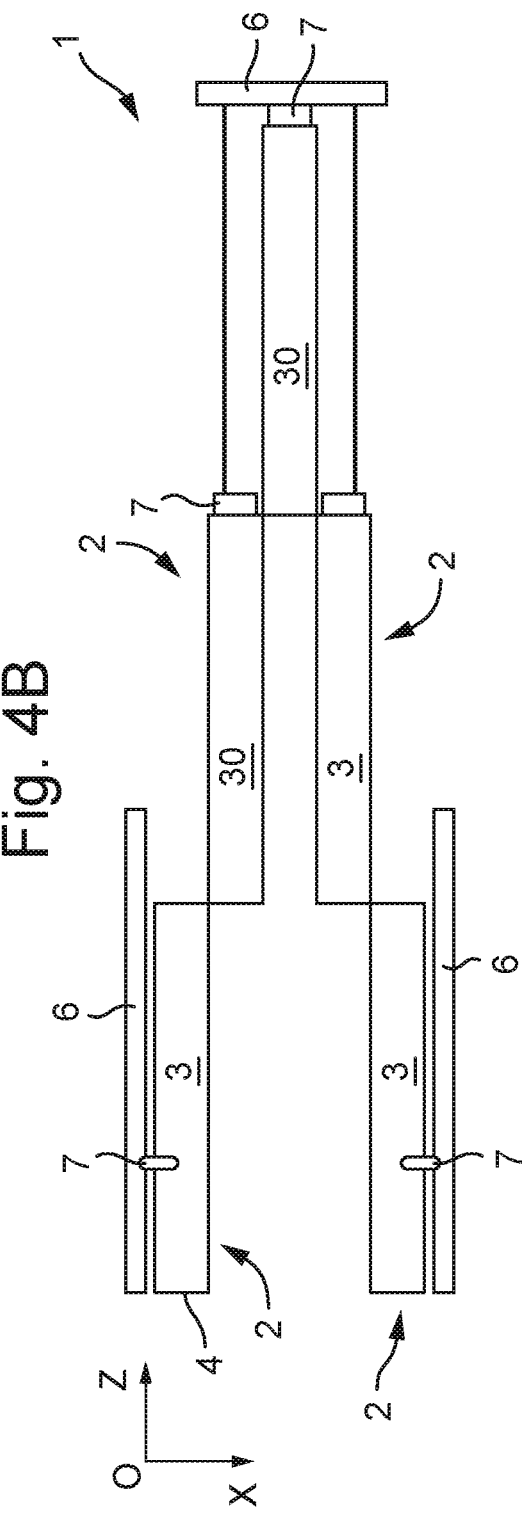

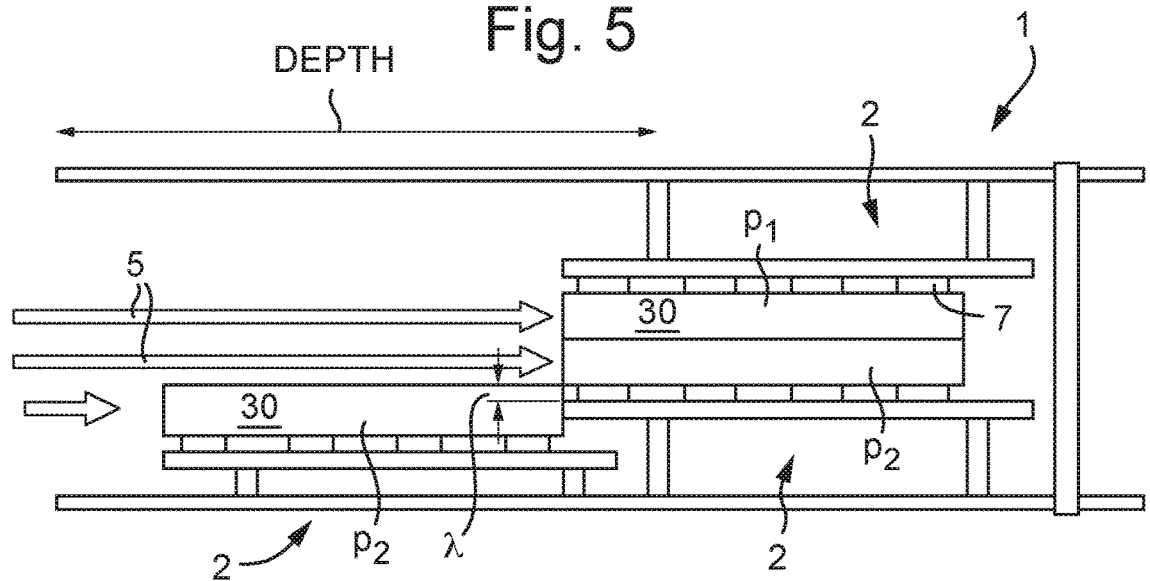
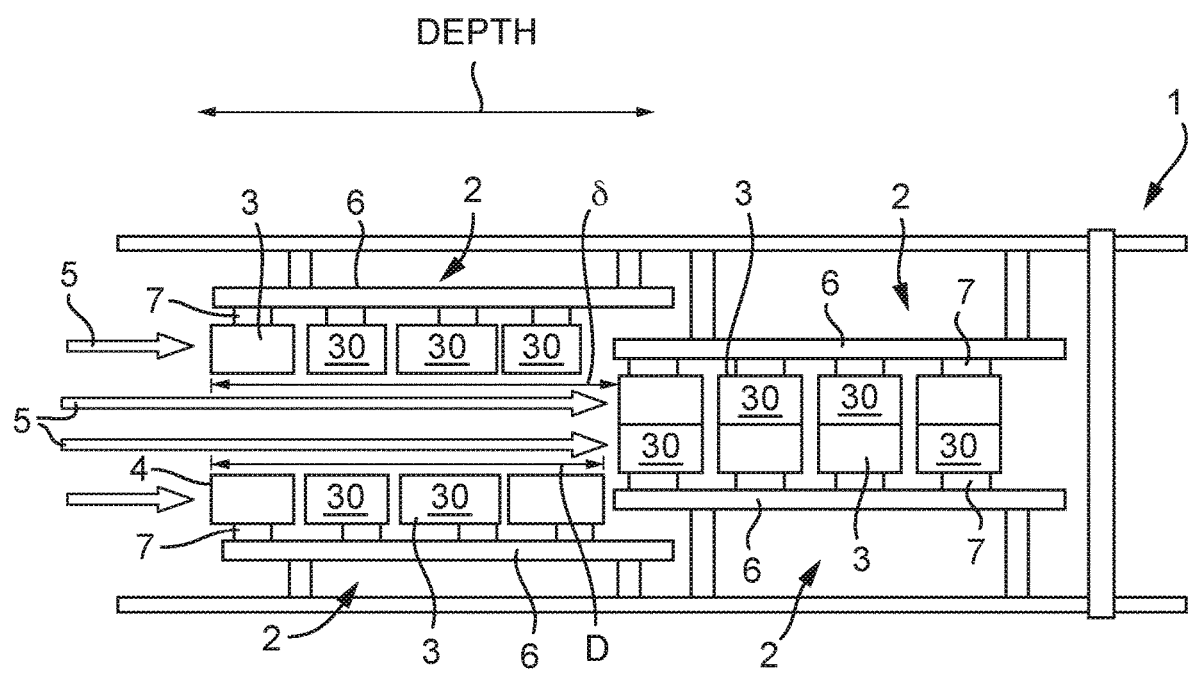

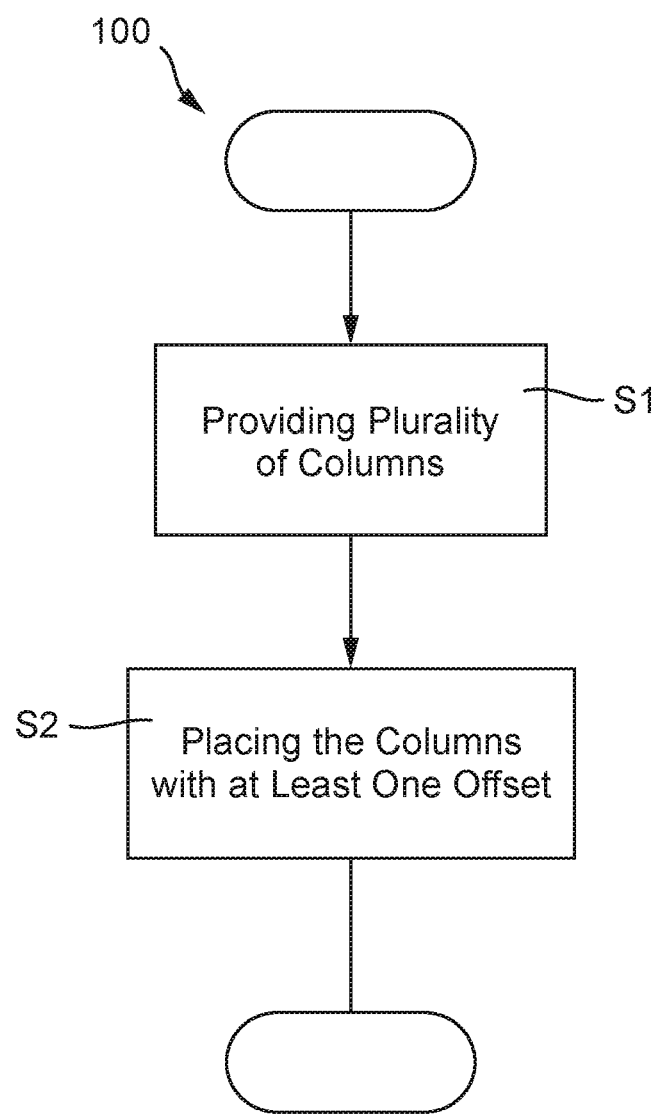

MATRIX OF DETECTORS WITH STAGGERED COLUMNS

CROSS-REFERENCE TO RELATED APPLICATIONS

This application is a national stage application of PCT/GB2021/051179 filed on May 17, 2021, which claims priority to GB Application No. 2007299.7 filed on May 18, 2020, the disclosures of which are hereby incorporated by reference herein in their entirety as part of the present application.

FIELD OF DISCLOSURE

The disclosure relates but is not limited to a matrix of detectors configured to be used in a system for inspecting cargo using inspection radiation. The disclosure also relates to a method of manufacturing such a matrix of detectors.

BACKGROUND

The optimal number of columns in a matrix of detectors depends on the type of cargo inspection system on which the matrix is to be mounted (whether the system is a portal, a mobile system or a gantry, for example) and on the desired scanning speed.

The matrix of detectors may be made of a matrix of scintillating crystal glued on a corresponding matrix of photodiodes.

The respective matrices of photodiodes for matrices with different numbers of columns are different. Similarly, the respective matrices of scintillating crystal for matrices with different numbers of columns are different. Each of the different matrices of photodiodes and each of the different matrices of scintillating crystal are manufactured for the different types of matrices of detectors, depending of the required numbers of columns.

BRIEF DESCRIPTION

Aspects and embodiments of the disclosure are set out in the appended claims. These and other aspects and embodiments of the disclosure are also described herein.

BRIEF DESCRIPTION OF DRAWINGS

Embodiments of the present disclosure will now be described, by way of example, with reference to the accompanying drawings, in which:

FIG. 4A schematically illustrates a top view of another example matrix of detectors, including four columns with every column being offset with respect to an adjacent column;

FIG. 4B schematically illustrates a top view of another example matrix of detectors, including five columns with every column being offset with respect to an adjacent column;

FIG. 5 schematically illustrates a top view of another example matrix of detectors, including three columns with two columns not being offset with respect to each other;

FIG. 6 schematically illustrates a top view of another example matrix of detectors, including four columns with a plane of symmetry, with detector modules including a plurality of stacked detectors; and FIG. 7 schematically illustrates a flowchart of an example method for manufacturing a matrix of detectors according to any aspect of the disclosure.

In the figures, similar elements bear identical numerical references.

DETAILED DESCRIPTION

Overview

Embodiments of the disclosure provide a matrix of detectors for an inspection system for inspecting cargo using inspection radiation. The matrix of detectors may include a plurality of columns extending in a longitudinal direction substantially perpendicular to a scanning direction. Each column includes a plurality of modules for receiving the inspection radiation. The plurality of columns are adjacent to each other in a lateral direction substantially parallel to the scanning direction, to form the matrix of detectors. In the plurality of columns, at least two columns are offset with respect to each other in an in-depth direction substantially perpendicular to both the lateral direction and the longitudinal direction.

In embodiments of the disclosure, the offset enables the use of a scalable architecture for the matrix of detectors. In embodiments of the disclosure, the offset enables increasing or decreasing the number of columns, using identical or similar columns and/or identical or similar detector modules regardless of the number of columns. In embodiments of the disclosure, the offset enables increasing or decreasing the number of columns without using matrices of photodiodes or matrices of scintillating crystal dedicated to a given number of columns.

The scalability enabled by embodiments of the disclosure enables relatively low manufacturing costs.

Detailed Description of Example Embodiments

Figure 1A:
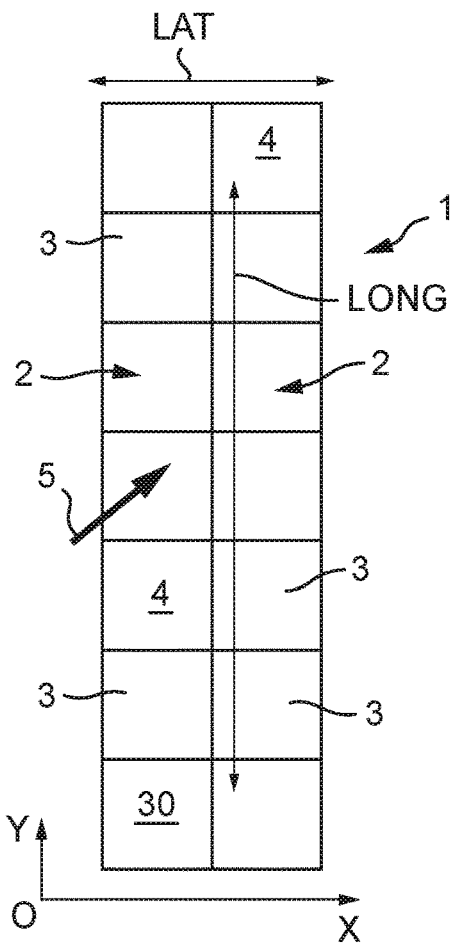
FIG. 1A schematically illustrates an elevated view of an example matrix of detectors according to the disclosure, viewed in an in-depth direction (OZ) of propagation of the inspection radiation.
Figure 1B:
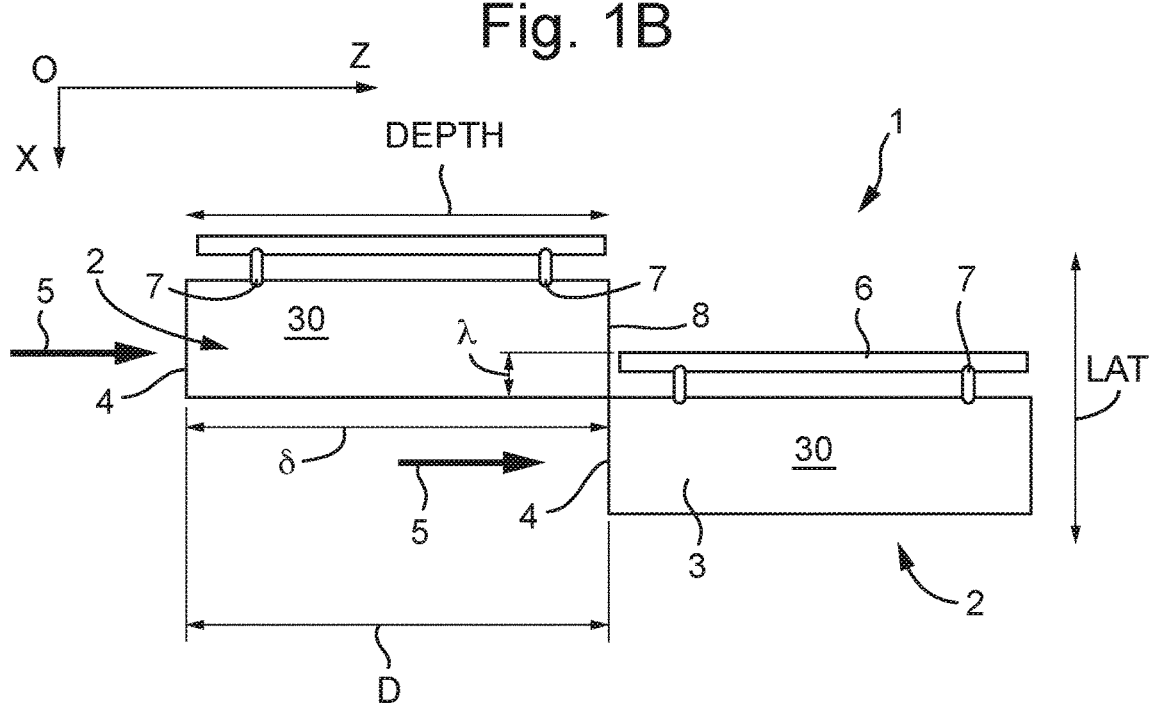
FIG. 1B schematically illustrates a top view of the example matrix of detectors of FIG. 1A, with a first offset.

FIGS. 1A and 1B schematically illustrate an example matrix 1 of detectors configured to be used in a system for inspecting cargo using inspection radiation.

In FIGS. 1A and 1B, the matrix 1 of detectors includes a plurality n (n≥2, with n=2 in FIGS. 1A and 1B) of columns 2 of detector modules 3.

As illustrated in FIGS. 1A and 1B, the detector modules 3 of each column 2 extend along a substantially longitudinal direction LONG. In FIGS. 1A and 1B, the longitudinal direction LONG is substantially parallel to the direction (OY).

Each detector module 3 includes an inspection surface 4 configured to receive the inspection radiation 5. In FIGS. 1A and 1B, the inspection surfaces 4 are substantially parallel to the plane (OXY).

The plurality n of columns 2 of detector modules 3 are adjacent to each other in a lateral direction LAT substantially perpendicular to the longitudinal direction LONG and substantially parallel to the inspection surfaces 4 of the detector modules 3. In FIGS. 1A and 1B, the lateral direction LAT is substantially perpendicular to the direction (OY) and substantially parallel to the plane (XOY). In FIGS. 1A and 1B, the lateral direction LAT is substantially parallel to the direction (OX).

As illustrated in FIGS. 1A and 1B, the plurality n of columns 2 includes at least two columns 2 being offset with respect to each other in an in-depth direction DEPTH substantially perpendicular to both the lateral direction LAT and the longitudinal direction LONG.

In FIGS. 1A and 1B, the two columns 2 are offset by an offset δ with respect to each other in the direction (OZ) substantially perpendicular to both the lateral direction LAT and the longitudinal direction LONG. In FIGS. 1A and 1B, the offset δ is measured between the inspection surfaces 4 of one column 2 and the inspection surfaces 4 of another, offset column 2.

As explained in greater detail below, the offset δ in the in-depth direction DEPTH may enable at least partial overlap of the columns in the lateral direction LAT. The at least partial overlap of the columns in the lateral direction LAT may enable the use of identical or similar columns and/or identical or similar detector modules in a scalable architecture for the matrix of detectors.

As illustrated in the Figures, in some embodiments, each column 2 includes at least one printed circuit board 6.

In the example of FIGS. 1A and 1B, the at least one printed circuit board 6 is adjacent to the detector modules 3 of the column 2, and extends in a plane substantially perpendicular to the inspection surfaces 4 of the detector modules 3 of the column 2. In the example of FIGS. 1A and 1B, the at least one printed circuit board 6 extends in a plane substantially parallel to the plane (YOZ) which is perpendicular to the inspection surfaces 4 of the detector modules 3 of the column 2.

In the example of FIG. 4A, the at least one printed circuit board 6 is at least partly adjacent to the detector modules 3 of the column 2, and extends in a plane substantially parallel to the inspection surfaces 4 of the detector modules 3 of the column 2. In the example of FIG. 4A, the at least one printed circuit board 6 extends in a plane substantially perpendicular to the plane (YOZ) which is perpendicular to the inspection surfaces 4 of the detector modules 3 of the column 2.

In the example of FIG. 4B, one printed circuit board 6 extends in a plane substantially parallel to the inspection surfaces 4 of the detector modules 3 of the column 2 (in a plane substantially perpendicular to the plane (YOZ), and two printed circuit boards 6 extend in a plane substantially perpendicular to the inspection surfaces 4 of the detector modules 3 of the column 2 (in a plane substantially parallel to the plane (YOZ)).

Other configurations and combinations of the positions of the circuit boards 6 are envisaged.

As illustrated in the Figures, each detector module 3 includes at least one detector 30 configured to interact with the inspection radiation. As illustrated in the Figures, each detector module 3 includes at least one sensor 7 configured to detect a response of the detector 30 to interaction with the inspection radiation 5. As illustrated in the Figures, the at least one sensor 7 may be located between the at least one printed circuit board 6 and the at least one detector 30.

As illustrated in FIGS. 1A and 1B, the offset δ in the in-depth direction DEPTH enables the partial overlap A of the columns 2 in the lateral direction LAT, and enables the use of identical columns and/or identical detector modules in a scalable architecture for the matrix of detectors. As illustrated in FIGS. 1A and 1B, the partial overlap λ of the columns 2 in the lateral direction LAT is such that a back surface 8 of the detector 30, opposed to the inspection surface 4, of one column 2 at least partially or entirely covers, in the lateral direction LAT, the at least one printed circuit 6 and the at least one sensor 7 of another column 2. In FIGS. 1A and 1B, the offset δ and the overlap λ are such that the detector 30 of one column 2 does not overlap, in the lateral direction LAT, the detector 30 of another column 2.

Figure 2:
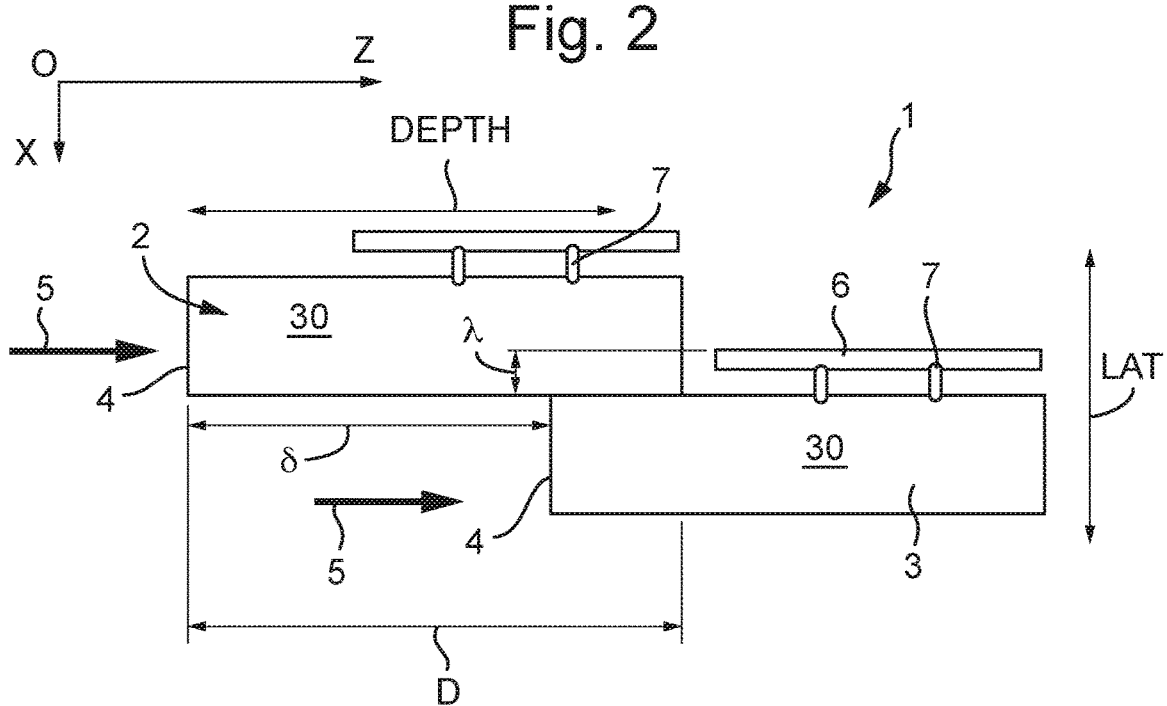
FIG. 2 schematically illustrates a top view of another example matrix of detectors, with a second offset.

FIGS. 1B and 2 illustrate examples of the offset δ such that $$0 < \delta \leq D,$$

with D being a dimension of the detector modules 3 in the in-depth direction DEPTH.

FIG. 6 illustrates an example of the offset δ such that:

$$D < \delta$$

Typical detector modules for high energy cargo inspection systems may be made of high density crystals with D smaller than 5 cm. Typical distances L between an inspection radiation source and the matrix of detectors are between about 5m and about 15m. The dimension D of the detector modules may be negligible compared to the distances L for a range of 8 and in some examples the offset δ may be such that:

$$0 < \delta \leq 5D,$$

with D being a dimension of the detector modules 3 in the in-depth direction DEPTH.

FIGS. 1B and 2 also illustrate that the matrix 1 may include an even number of columns 2.

As explained in greater detail below, the offset δ enables increasing or decreasing the number of columns, using identical or similar columns and/or identical or similar detector modules regardless of the number of columns.

Figure 3:
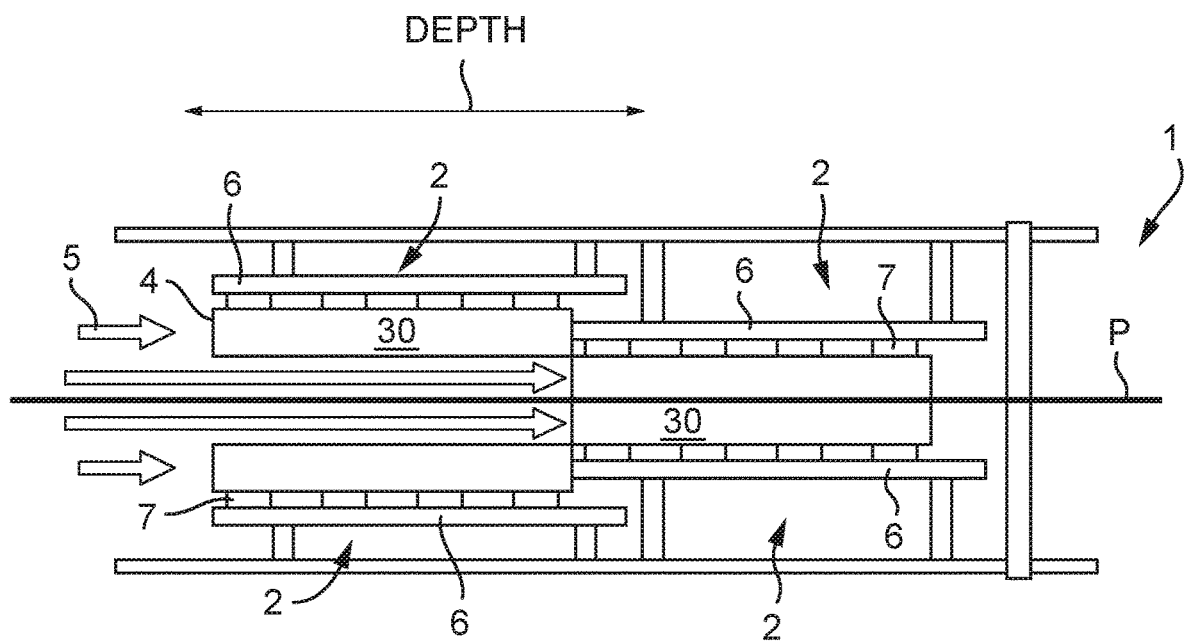
FIG. 3 schematically illustrates a top view of another example matrix of detectors, including four columns with a plane of symmetry.

As illustrated in FIG. 3, the matrix 1 may include an even number n of columns 2 (n=4 in FIG. 3) and may have a central plane of symmetry P. In FIG. 3 the central plane of symmetry P may be substantially parallel to the in-depth direction DEPTH. In FIG. 3 the plurality n includes four columns, but other numbers of columns may be envisaged, such as six, eight or ten columns as non-limiting examples.

FIGS. 4A and 4B schematically illustrate examples of matrices 1 where each column 2 of the plurality of columns 2 is offset with respect to an adjacent column in the plurality of columns.

FIGS. 4B and 5 schematically illustrate examples of matrices 1 including an odd number of columns (five columns in FIG. 4B and three columns in FIG. 5—other numbers may be envisaged).

As illustrated in FIG. 5, when the plurality of columns of detector modules includes at least three columns, the plurality of columns 2 may include at least two columns of detectors p1 and p2 not being offset with respect to each other in the in-depth direction, while p2 and p3 are offset with respect to each other in the in-depth direction.

In FIGS. 1A, 1B, 2, 3, 4A, 4B and 5, each detector module 3 includes a single detector 30 in a direction substantially parallel to the in-depth direction DEPTH.

As illustrated in FIG. 6, in some examples each detector module 3 may include a plurality of detectors 30 stacked in a direction substantially parallel to the in-depth direction DEPTH. Such detector modules may be advantageously used e.g. for material discrimination.

In FIGS. 1B and 2, each detector 30 includes e.g. two sensors 7. In FIGS. 3 and 5, each detector 30 includes e.g.

four sensors 7. In FIGS. 4A, 4B and 6, each detector 30 includes e.g. one sensor 7. Other numbers of sensors are envisaged.

In some examples, each detector 30 includes a scintillator configured to re-emit light in response to interaction with the inspection radiation, and the at least one sensor 7 includes at least one photodiode configured to detect the re-emitted light.

As illustrated in FIG. 7, the disclosure also relates to a method 100 of manufacturing a matrix of detectors according to any aspect of the disclosure.

The method 100 includes:
- providing, at S1, a plurality of columns of detector modules, the detector modules of each column extending along a substantially longitudinal direction, each detector module including an inspection surface configured to receive inspection radiation; and
- placing, at S2, the provided plurality of columns adjacent to each other in a lateral direction substantially perpendicular to the longitudinal direction and substantially parallel to the inspection surfaces of the detector modules such that the plurality of columns of detector modules includes at least two columns of detector modules being offset with respect to each other in an in-depth direction substantially perpendicular to both the lateral direction and the longitudinal direction.

The invention claimed is:

1. A matrix of detectors configured to be used in a system for inspecting cargo using inspection radiation, the matrix comprising a plurality of columns of detector modules,
   the detector modules of each column extending along a substantially longitudinal direction,
   each detector module comprising an inspection surface configured to receive the inspection radiation, and
   the plurality of columns of detector modules being adjacent to each other in a lateral direction substantially perpendicular to the longitudinal direction and substantially parallel to the surfaces of the detector modules,
   wherein the plurality of columns of detector modules comprises at least two columns of detector modules being offset with respect to each other in an in-depth direction substantially perpendicular to both the lateral direction and the longitudinal direction, wherein an offset $\delta$ between the inspection surfaces of one column and the inspection surfaces of another, offset column is such that:

$0 < \delta \leq 5D$, wherein D is a dimension of the detector modules in the in-depth direction.

2. The matrix of claim 1, comprising an even number of columns.

3. The matrix of claim 2, having a central plane of symmetry, the central plane of symmetry being substantially parallel to the in-depth direction and substantially parallel to the longitudinal direction.

4. The matrix of claim 1 comprising an odd number of columns.

5. The matrix of claim 1, wherein each column of the plurality of columns is offset with respect to an adjacent column in the plurality of columns.

6. The matrix of claim 1, wherein the plurality of columns of detector modules comprises at least three columns and at least two adjacent columns of detectors not being offset with respect to each other in the in-depth direction.

7. The matrix of claim 1, wherein at least one column comprises at least one printed circuit board,
   wherein the at least one printed circuit board is adjacent to the detector modules of the column and extends in a plane substantially perpendicular to the surfaces of the detector modules of the column configured to receive the inspection radiation.

8. The matrix of claim 1, wherein at least one column comprises at least one printed circuit board,
   wherein the at least one printed circuit board is at least partly adjacent to the detector modules of the column and extends in a plane substantially parallel to the surfaces of the detector modules of the column configured to receive the inspection radiation.

9. The matrix of claim 1, wherein each detector module comprises:
   a single detector in a direction substantially parallel to the in-depth direction, the detector being configured to interact with the inspection radiation, or
   a plurality of detectors stacked in a direction substantially parallel to the in-depth direction.

10. The matrix of claim 9, wherein each detector module comprises at least one sensor configured to detect a response of the detector to interaction with the inspection radiation.

11. The matrix of claim 10, wherein each detector comprises:
    a scintillator configured to re-emit light in response to interaction with the inspection radiation.

12. The matrix of claim 11, wherein the at least one sensor comprises at least one photodiode configured to detect the re-emitted light.

13. A method comprising:
    providing a plurality of columns of detector modules, the detector modules of each column extending along a substantially longitudinal direction, each detector module comprising an inspection surface configured to receive inspection radiation; and
    placing the provided plurality of columns adjacent to each other in a lateral direction substantially perpendicular to the longitudinal direction and substantially parallel to the surfaces of the detector modules such that the plurality of columns of detector modules comprises at least two columns of detector modules being offset with respect to each other in an in-depth direction substantially perpendicular to both the lateral direction and the longitudinal direction, wherein an offset $\delta$ between the inspection surfaces of one column and the inspection surfaces of another, offset column is such that:

$0 < \delta \leq 5D$, wherein D is a dimension of the detector modules in the in-depth direction.

* * * * *